Patented June 25, 1940

2,205,390

UNITED STATES PATENT OFFICE 2,205,390

COPOLYMERS OF STYRENE AND 2-CHLOROALLYL ESTERS

Edgar C. Britton, Gerald H. Coleman, and John W. Zemba, Midland, Mich., assignors to The Dow Chemical Company, Midland, Mich., a corporation of Michigan No Drawing. Application June 10, 1938, Serial No. 213,022

15 Claims. (Cl. 260—80)

This invention relates to new polymers of styrene obtained by polymerizing styrene in the presence of certain esters of 2-chloroallyl alcohol.

The 2-chloroallyl esters which may be copolymerized with styrene to form the new products contain at least two ethylenic linkages in the molecule. Accordingly, such esters may be of two general types: (1) esters of 2-chloroallyl alcohol with saturated di-carboxylic acids, such as oxalic acid, malonic acid, etc., and (2) esters of 2-chloroallyl alcohol with unsaturated mono- or dicarboxylic acids, such as maleic acid, crotonic acid, etc. Specific examples of the first type of esters are di-(2-chloroallyl) oxalate, di-(2-chloroallyl) succinate, di-(2-chloroallyl) adipate, di-(2-chloroallyl) phthalate, di-(2-chloroallyl) sebacate, etc. Examples of esters of the second type include 2-chloroallyl crotonate, 2-chloroallyl cinnamate, 2-chloroallyl furoate, 2-chloroallyl methacrylate, di-(2-chloroallyl) fumarate, 2-chloroallyl tiglate, 2-chloroallyl sorbate, di-(2-chloroallyl) citraconate, etc. In preparing the new styrene copolymers we prefer to employ 2-chloroallyl esters containing not more than 10 carbon atoms in the acid residue, i. e. esters of 2-chloroallyl alcohol with acids containing not more than 10 carbon atoms exclusive of the carboxyl groups, since products having most desirable physical properties are obtained by using such esters, but esters of higher molecular weight may successfully be employed.

The products formed by the conjoint polymerization of styrene and 2-chloroallyl esters of the present class vary in form from clear, transparent resins to opaque white powdery materials, depending upon the conditions under which the polymerization is carried out. All such products are thermoplastic and may be molded to obtain clear, transparent bodies which display less tendency than polystyrene itself to blush or craze on standing. They possess excellent dielectric properties and are adapted to a wide variety of uses in making films, coating compositions, laminations, impregnating compositions, etc.

The new copolymers are distinct from polystyrene in their behavior towards organic solvents, particularly aromatic hydrocarbon solvents such as benzene, toluene, and xylene. When obtained by polymerizing at temperatures above approximately 180° C., the resins are clear, and are usually soluble in the above aromatic solvents. The copolymers obtained by polymerizing at temperatures below 180° C. but above 110° C. are also usually clear, but are nearly insoluble in liquids which are solvents for polystyrene, e. g. benzene, toluene, etc., although they have the property of swelling when in contact with such solvents. By polymerizing at temperatures below 110° C., preferably between 50° and 80° C., an opaque powdery form of copolymer may be obtained which is insoluble and non-swelling in polystyrene solvents, but which is usually accompanied by more or less of the swelling type of polymer.

The new products are prepared by mixing a minor proportion of an ester of the present class with styrene or partially polymerized styrene and thereafter polymerizing the mixture in any of the known ways in the presence or absence of added agents such as solvents, fillers, polymerization catalysts, modifying agents, plasticizers, emulsifying agents, etc. The properties and form of the polymers vary with changes in conditions under which the polymerization is carried out, those conditions having the greatest effect being time, temperature, and the proportion of the 2-chloroallyl ester in the mixture.

The proportion of 2-chloroallyl ester and styrene may be varied considerably, although the solubility of the copolymer in aromatic solvents and/or its tendency to swell in such solvents decrease as the proportion of ester is increased. For example, a polymer prepared by polymerizing monomeric styrene at 140 C. in the presence of 0.25 per cent by weight of di-(2-chloroallyl) adipate is partially soluble in benzene, whereas a similar polymer containing 2.5 per cent of the ester is substantially insoluble and non-swelling in benzene. In general, it is preferable to employ between 0.0025 and 0.25 part by weight of the 2-chloroallyl ester per part of styrene. The use of less than 0.25 per cent of the ester leads to the formation of polystyrene-like products, while the use of more than 25 per cent leads to the formation of soft, gum-like polymers, which, however, are insoluble and are useful in the preparation of rubber-like compositions.

The polymerization of a liquid mixture of styrene and an ester of the present type takes place very slowly on standing in the dark at room temperature. Accordingly, such liquid mixture may be shipped in closed containers to the ultimate consumer, by whom it may be polymerized in any desired manner. The liquid mixture may be further stabilized against polymerization by light or moderately elevated temperatures by the addition of an inhibitor, such as quinone, trinitrobenzene, etc. Polymerization of the mixture can be accelerated by the use of heat, actinic light, or a catalyst. In practice, the polymerization is usually carried out at temperatures between about 50° C. and about 180° C., although temperatures as high as 250° C. may be employed. The polymerization may be further accelerated by the use of a small proportion, e. g. 0.5 per cent by weight or less of a catalyst, such as benzoyl peroxide, strong mineral acid, ozone, etc. The use of such accelerating agents in considerable amounts may lead to the formation of brittle products of low molecular weight, but when employed in the above small proportions they have little effect on the properties of the products.

Under any given set of polymerizing conditions, the viscosity and average molecular weight of a liquid mixture of styrene and an ester of the present class gradually increase until solidification occurs, after which the average molecular weight of the solid polymer continues to increase until the polymerization is complete. Accordingly, liquid products of desired viscosity or solid products which, when dissolved in a suitable solvent, give solutions of desired viscosity, may be prepared by interrupting the polymerization at a selected point and thereafter removing the unpolymerized material, e. g. by distillation, extraction, or otherwise. Such products are adapted to use in lacquers, varnishes, paints, etc., or may be employed in the manufacture of films and foils. The polymerization may thus be controlled to obtain polymerized products varying over a wide range in such characteristics as molecular weight, solubility, physical properties, etc.

The low molecular weight polymers initially formed are usually soluble in benzene, but as the polymerization continues, with progressive increase in molecular weight, the polymers become substantially insoluble in benzene except when a polymerization temperature of above approximately 180 C. is employed. As hereinbefore indicated, the rate at which such insoluble polymers are formed increases with increase in the proportion of 2-chloroallyl ester in the mixture.

The solid polymers are usually obtained in a form suitable for molding without further purification, but if an especially refined product is desired, the initial products may be ground, extracted with a solvent such as acetone or ethanol, and dried to form molding powders. If the polymer is of the type capable of being swelled, it may be dispersed in a swelling solvent such as benzene, and then precipitated in finely divided form by addition of a non-solvent liquid, such as ethanol. As in the case of polystyrene itself, the physical properties, e. g. tensile strength, impact strength, hardness, etc., of the new copolymers vary somewhat with the purity of the styrene employed in preparing them.

The following examples illustrate various ways in which the principle of the invention has been applied, but are not to be construed as limiting the same:

EXAMPLE 1

A mixture of 50 parts of monomeric styrene and 1 part of 2-chloroallyl crotonate is polymerized by heating at approximately 80° C. for 7 days. The copolymer obtained is a tough, transparent, colorless resin, capable of being molded. It is substantially insoluble in benzene, but swells somewhat when contacted therewith. The copolymer is ground and molded at 160° C. to obtain a molded specimen which shows a tensile strength of approximately 7500 lbs./sq. in., an impact strength of about 2.0 in. lbs., and a Shore Scleroscope hardness of about 87.

EXAMPLE 2

A mixture of 10 parts of styrene and 1 part of di-(2-chloroallyl) phthalate is polymerized by heating at 100° C. for 7 days. During polymerization there forms within the mixture an opaque white material resembling a mass of cotton linters in appearance. The completely polymerized product is a clear, transparent mass having suspended therein a substantial quantity of such opaque product. The two types of copolymers may be separated by swelling the glass-like material to a thin gel in a large amount of benzene or other solvent and decanting such gel from the opaque white material which is insoluble and non-swelling in aromatic solvents. A molded specimen of the opaque white material is a clear, transparent resin having strength characteristics similar to polystyrene. The two types of polymers may also be separated by a grinding process since the opaque material is more readily ground to a powder than is the glass-like copolymer. When ground to a fine powder, the opaque type of copolymer has an appearance of powdered sugar or starch and has a peculiar elastic feel when rubbed between the fingers.

EXAMPLE 3

A mixture of 10 parts of styrene and 1 part of di-(2-chloroallyl) adipate are heated at 80° C. for 3 days. The polymerized product consists of a glass-like resin having suspended therein a small amount of the white material described in Example 2. The entire polymerized mass is taken up in benzene whereby the glass-like material is dispersed to a thin gel. The benzene dispersion is decanted from the insoluble, non-swelling white material and is poured into ethanol to precipitate the dispersed polymer in finely divided form. After drying, the precipitated material is suitable for use as a molding powder. A molded test specimen is a clear, transparent resin having a tensile strength of approximately 5500 lbs./sq. in., an impact strength of about 0.8 in. lbs., and a heat distortion value of about 75° C.

EXAMPLE 4

10 parts of styrene and 1 part of 2-chloroallyl furoate are copolymerized by heating at approximately 80° C. for 64 hours to obtain a copolymer consisting almost entirely of a swollen white mass which is insoluble and non-swelling in benzene and similar aromatic hydrocarbon solvents. The product is ground and extracted with acetone to remove any unreacted 2-chloroallyl furoate. A molded specimen of the copolymer is a clear, glass-like resin having a tensile strength of about 7500 lbs./sq. in., a Shore hardness of 86, and a heat distortion value of about 89° C.

EXAMPLE 5

The following table presents data showing the effect of varying amounts of the copolymerizing agent on the benzene solubility of the copolymer of styrene and di-(2-chloroallyl) adipate. The polymerization was carried out by heating the mixture at 80° C. for 14 days.

Table

| Styrene | Di-(2-chloroallyl) adipate | Benzene solubility | Remarks |
|---|---|---|---|
| Parts | Parts | | |
| 50 | 0.125 | Partially soluble | Swelled in benzene. |
| 50 | 0.25 | ------do------ | Do. |
| 50 | 0.5 | ------do------ | Do. |
| 50 | 2.5 | Slightly soluble | Do. |
| 50 | 5.0 | Insoluble | Slight swelling. |
| 50 | 12.5 | ------do------ | Substantially non-swelling. |

Example 6

A mixture of 10 parts of styrene and 1 part of di-(2-chloroallyl) succinate is polymerized by heating at approximately 100° C. for 7 days. The polymerized product consists of about 90 per cent of a hard, clear resin, and about 10 per cent of the insoluble, non-swelling, opaque material. The clear resinous polymer is insoluble in acetone and ethanol and forms an insoluble gel in benzene.

Example 7

A mixture of 50 parts of styrene and 1 part of di-(2-chloroallyl) oxalate is heated at 80° C. for 7 days. The co-polymer obtained is a glass-like resin containing a few small particles of the opaque white material described in Example 2. The copolymer is ground, and molded to form a hard, clear resin which is insoluble in benzene. The molded specimen has a power factor of about 0.07 per cent, a dielectric constant of about 2.35, and a softening point of about 117° C.

The invention is not limited to binary copolymers of styrene and one of the esters of the present class, but also includes polynary copolymers formed by the copolymerization of styrene and a 2-chloroallyl ester with other copolymerizing or modifying agents, e. g. other 2-chloroallyl esters, diallyl maleate, trimethallyl phosphate, allyl cinnamate, the di-cinnamate of 1.4-dioxanediol-2.3, etc. Also, a mixture of styrene and a copolymerizing agent of the present class may be polymerized in the presence of plasticizing agents to form plasticized copolymers. Such alternative modes of operation are illustrated by the following examples:

Example 8

A mixture of 200 parts of styrene, 40 parts of 2-chloroallyl furoate, and 1 part of the di-cinnamate 1.4-dioxanediol-2.3 is polymerized by heating at 80° C. for 7 days. The copolymer obtained consists almost entirely of the opaque white type of polymer which is insoluble and non-swelling in benzene. This material is easily ground to a fine powder which is suitable for use as a molding powder. A molded specimen has the unusually high softening point of 160° C.

Example 9

A mixture of 200 parts of styrene, 18 parts of 2-chloroallyl cinnamate, and 1 part of the dicinnamate of 1.4-dioxanediol-2.3 was polymerized at 80° C. for 7 days. The copolymer obtained was a hard, glass-like mass having a considerable quantity of the opaque white type of polymer suspended therein.

Example 10

A mixture of 50 parts of styrene, 5 parts of 2-chloroallyl furoate, and 5 parts of a plasticizing agent (butyl acetyl ricinoleate) is polymerized by heating at 80° C. for 7 days. The polymerized product consists of a hard resinous mass containing about 50 per cent of the insoluble, non-swelling type of polymer. A molded specimen is clear and transparent and somewhat softer and more flexible than a similar specimen of the unplasticized copolymer.

The mixtures of styrene and 2-chloroallyl esters herein described may, if desired, be polymerized in the presence of added agents such as dyes, pigments, solvents, emulsions, fillers, etc. to obtain polymerized products having properties modified by the presence of such added substances. For example, a mixture of partially polymerized styrene and a 2-chloroallyl ester may be emulsified with water with the aid of an emulsifying agent such as albumin, and the resulting emulsion subjected to polymerizing conditions. Also, various addition agents, such as fillers, dyes, plasticizers, etc., may be incorporated with the solid copolymers before molding to produce decorative effects or to modify the physical properties of the molded products.

Other modes of applying the principle of our invention may be employed instead of those explained, change being made as regards the method herein disclosed or the product obtained, provided the process stated by any of the following claims be employed or the product claimed in any of the following claims be obtained.

We therefore particularly point out and distinctly claim as our invention:

1. The process which comprises polymerizing a mixture of styrene and a 2-chloroallyl ester containing at least two ethylenic linkages.

2. The process which comprises polymerizing a mixture of styrene and a small proportion of a 2-chloroallyl ester having the general formula

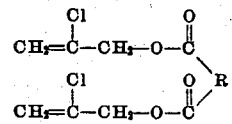

wherein R represents a saturated hydrocarbon group containing not more than 10 carbon atoms.

3. The process which comprises polymerizing a mixture of styrene and a small proportion of a 2-chloroallyl ester having the general formula

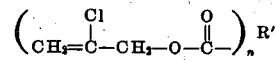

wherein R' represents a hydrocarbon group containing at least one ethylenic linkage but containing not more than 10 carbon atoms, and $n$ represents an integer not greater than 2.

4. The process which comprises heating at a temperature between 50° and 180° C. a mixture of styrene with between 0.25 and 25 per cent of its weight of a 2-chloroallyl ester containing at least two ethylenic linkages.

5. The process which comprises polymerizing styrene with between 0.25 and 25 per cent of its weight of 2-chloroallyl crotonate.

6. The process which comprises polymerizing styrene with between 0.25 and 25 per cent of its weight of di-(2-chloroallyl) oxalate.

7. The process which comprises polymerizing styrene with between 0.25 and 25 per cent of its weight of 2-chloroallyl cinnamate.

8. A copolymer of styrene and a 2-chloroallyl ester containing at least two ethylenic linkages.

9. A copolymer of styrene and a 2-chloroallyl ester having the general formula

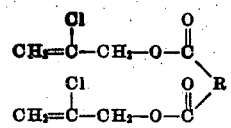

wherein R represents a saturated hydrocarbon radical containing not more than 10 carbon atoms.

10. A copolymer of styrene and a 2-chloroallyl ester having the general formula

wherein R' represents a hydrocarbon group containing at least one ethylenic linkage but containing not more than 10 carbon atoms, and $n$ represents an integer not greater than 2.

11. A copolymer of styrene and 2-chloroallyl crotonate.

12. A copolymer of styrene and di-(2-chloroallyl) oxalate.

13. A copolymer of styrene and 2-chloroallyl cinnamate.

14. A plasticized copolymer of styrene and a 2-chloroallyl ester containing at least two ethylenic linkages.

15. An insoluble copolymer of styrene and a 2-chloroallyl ester containing two ethylenic linkages.

EDGAR C. BRITTON.
GERALD H. COLEMAN.
JOHN W. ZEMBA.